Figure 5:
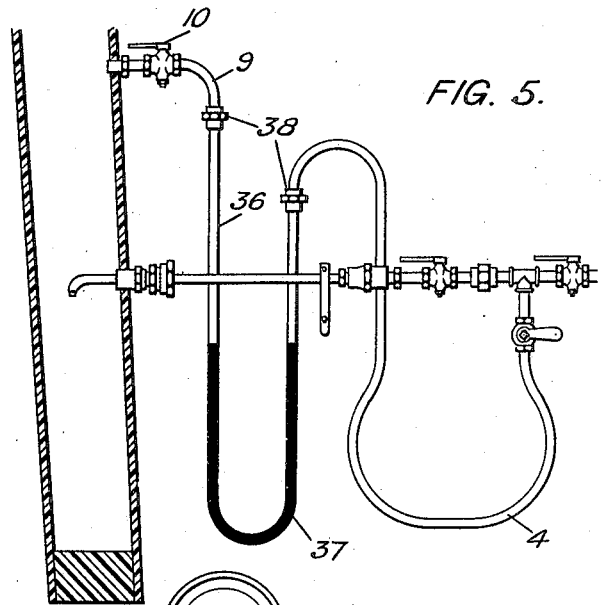

G. L. FOWLER.
APPARATUS FOR DETERMINING THE VELOCITY AND DIRECTION OF FLOW OF FLUIDS IN A CLOSED CHAMBER.
APPLICATION FILED DEC. 4, 1911.
1,057,631.
Patented Apr. 1, 1913.
3 SHEETS—SHEET 1.
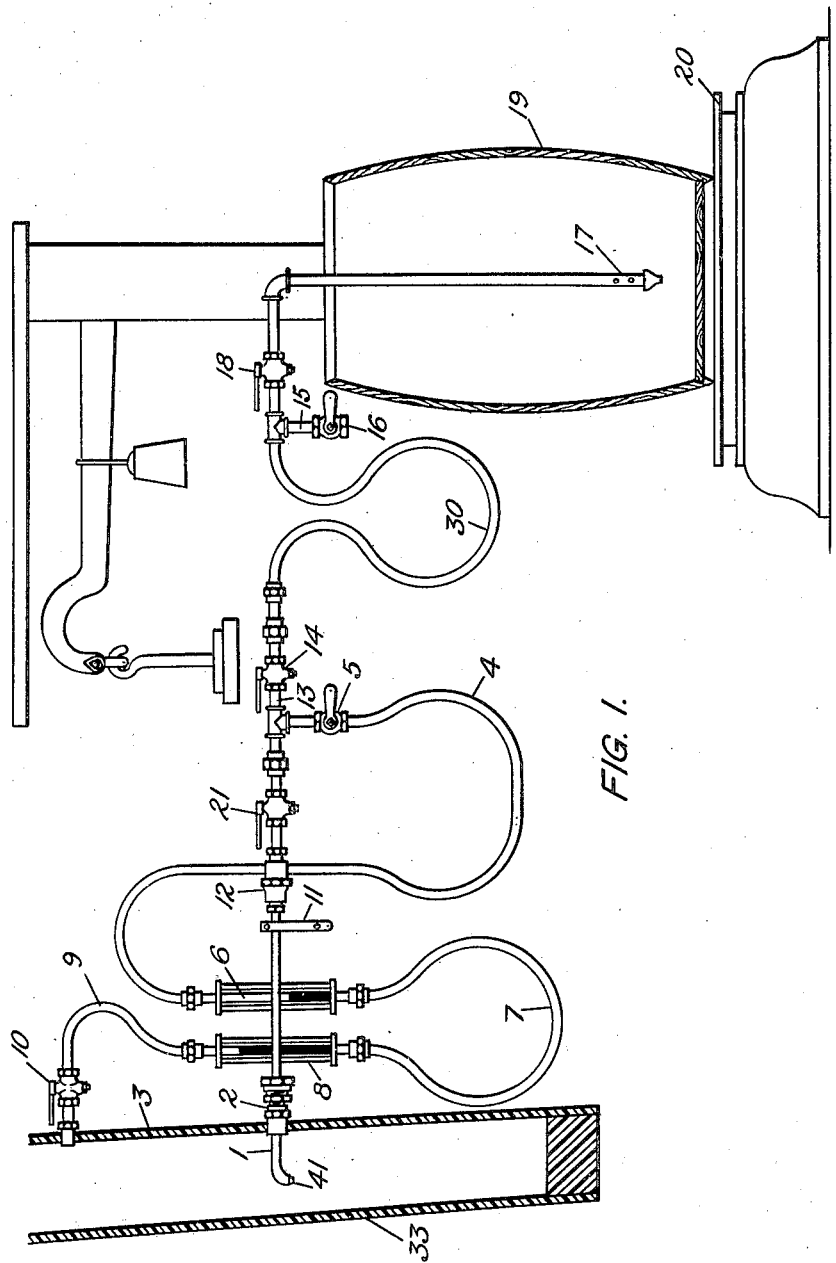
FIG. I.
WITNESSES:
M. G. Crawford
James R. Cole.
INVENTOR
George L. Fowler
BY
ATTORNEY G. L. FOWLER.
APPARATUS FOR DETERMINING THE VELOCITY AND DIRECTION OF FLOW OF FLUIDS IN A CLOSED CHAMBER.
APPLICATION FILED DEC. 4, 1911.
1,057,631.
Patented Apr. 1, 1913.
3 SHEETS—SHEET 2.
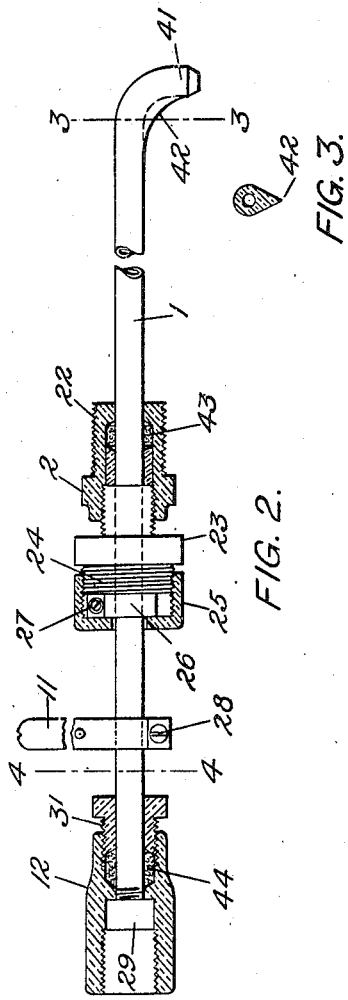
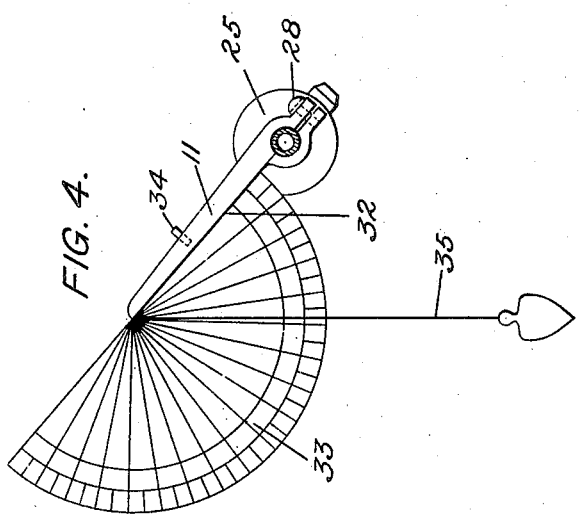
WITNESSES:
INVENTOR
George L. Fowler
BY
ATTORNEY

UNITED STATES PATENT OFFICE.

GEORGE L. FOWLER, OF NEW YORK, N. Y.

APPARATUS FOR DETERMINING THE VELOCITY AND DIRECTION OF FLOW OF FLUIDS IN A CLOSED CHAMBER.

1,057,631. Specification of Letters Patent. Patented Apr. 1, 1913.

Application filed December 4, 1911. Serial No. 663,786.

*To all whom it may concern:*

Be it known that I, GEORGE L. FOWLER, a citizen of the United States of America, residing at New York city, county and State of New York, have invented certain new and useful Improvements in Apparatus for Determining the Velocity and Direction of Flow of Fluids in a Closed Chamber, of which the following is a specification.

My invention is more particularly designed to provide means for determining the velocity and direction of the currents of water or steam, or of mixtures of water and steam, existing in a steam boiler during the generation of steam therein, and is illustrated as applied to the water chambers surrounding the fire box of the standard locomotive boiler. For this purpose I employ certain improved forms of what is known as the Pitot tube combined with any suitable form of calorimeter.

The Pitot tube in its simplest form consists of a tube having its nozzle bent usually at right angles to the axis of the main tube and inserted into a stream of liquid, the bent mouth of the tube opening up stream. The pressure due to the velocity of the stream then produces an elevation of the column of liquid in the body of the tube, if held above the plane of the horizon, above the level of the liquid in the stream which corresponds to such velocity, and from such elevation the velocity can be determined by well known formulæ.

As the fluid in question in the case of this invention is under pressure additional to that created by its own velocity, it is necessary to neutralize this additional pressure by also connecting the other end of the Pitot tube to the closed chamber containing the fluid under pressure. I then insert in the connection some differential pressure indicating device, or I connect the outer end of the Pitot tube with a pressure gage and compare its reading with that of another gage connected to the interior of the chamber so as to register the static pressure therein only. Again as the fluid under pressure in the steam boiler at the points where circulation velocities are being measured may be either water or steam, or a mixture of both, the simple indications of the Pitot tube, though they be accurate representations of the pressures produced at its mouth by the moving fluid, are not accurate representations of the velocities producing such pressures, because the weight of the moving fluid enters into the question, as well as its velocity, and that weight varies. The pressure indicated by the Pitot tube is not a simple function of the circulation velocity at that point, but it is a function of the product of the square of the velocity by mass of weight, and the density and consequent weight of the fluid varies at different points in a boiler within wide limits from that of pure water to that of pure steam. For the purposes of my invention it is therefore necessary to determine the mass or density of the fluid in motion at any one point at which the Pitot tube is inserted and combine this with the pressure indication in the Pitot tube, in order to determine the velocity which produced that pressure indication. To determine the mass of the fluid flowing against the mouth of the Pitot tube, I attach a calorimeter to the other end of the tube and allow a portion of the fluid to pass through the tube into the calorimeter. As the density of steam varies with its temperature and pressure, all the data necessary to an accurate determination of circulation velocity at that point in the boiler are thus obtained.

Figure 6:
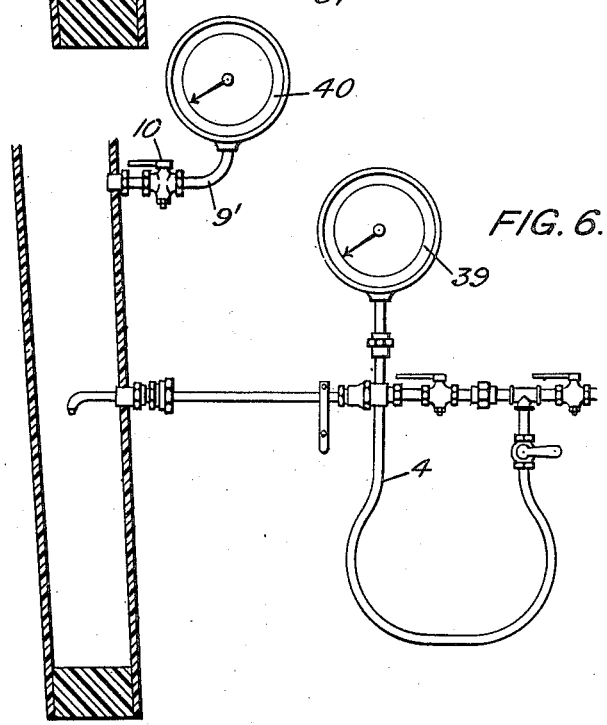

The best form of apparatus at present known to me embodying my invention, with certain modifications, are illustrated in the accompanying three sheets of drawings in which, Figure 1 is a side elevation with parts shown in section. Fig. 2 is an enlarged detail of the Pitot tube with the stuffing box and union therefor shown in section. Fig. 3 is a cross section on line 3—3 of Fig. 2. Fig. 4 is an enlarged cross section of the tube on line 4—4 of Fig. 2, with detail of means for determining the angular position of its bent end. Fig. 5 shows the tube with a modified form of pressure indicating device, and Fig. 6 shows another modification.

Throughout the drawings like reference characters indicate like parts.

1 is the Pitot tube and 2 the stuffing box by which a steam-tight connection between the tube and the side wall of the water space in a locomotive firebox 3, is established.

4 is a flexible tube, connected to the outer end of the Pitot tube, controlled by valve 5 and connected at the other end to the upper part of gage glass 6. The lower part of gage glass 6 is connected by flexible tube 7 with the lower part of another gage glass 8, the upper part of which is connected by tube 9 to the interior of the fire-box water space at another point, preferably adjacent to the point at which the tube 1 is inserted. This connection is controlled by a valve 10. For convenience a valve 21 may be placed in the connection to the outer end of the Pitot tube, between it and the branch to flexible tube 4. The bent end 41 of the tube is connected to the main portion by an easy curve and preferably has a V-shaped web or cut-water 42 on the inside of the curve.

11, is a radial arm clamped to the body of the tube as by the split ends held together by set screws 28 as shown in Fig. 4, and placed either parallel to the bent end 41 of the tube 1, or at a known angle thereto. By this arm the tube may be turned on its axis, rotating in stuffing box 2, and union 12 connecting the tube to the stationary system of piping. This system of piping has a branch 13 controlled by valve 14, and extending to calorimeter barrel 19. At the end of this branch near the calorimeter is a blow-off connection 15 controlled by valve 16. The branch 13 ends in calorimeter nozzle 17, between which and the blow off is another valve 18. For convenience a flexible section of tubing 30 may be inserted in branch 13. The calorimeter barrel 19 stands on the platform scales 20.

In the preferred form of stuffing box shown in Fig. 2, there is a threaded nipple 22 adapted to be screwed into an opening in the wall of the fire box 3, and into which the threaded gland 23 is screwed to compress packing 43. This gland has a threaded head 24, on which a cap 25 may be screwed. The adjustable clamp 26 is caused to grip tube 1 by screw connection 27 at any desired point and while this clamp and tube 1 may be turned on their common axis, they cannot slide along that axis because the clamp is confined between gland 23 and cap 25. The union 12 is held on the end of tube 1 by nut 29 screwed on the outer threaded end of 1, and the end of 12 is cored out to receive threaded gland 31, forming a stuffing box containing packing 44.

As shown in Fig. 4 the radial arm 11, has one side finished off to form a face 32 exactly radial to the axis of tube 1, and to this radial face the protractor 33 is fastened by clip 34, or in any convenient manner, and the plumb line 35 is fastened to the center of the protractor.

In the modification shown in Fig. 5, a U-shaped glass tube 36 is used, in place of gage glasses 6 and 8, and connecting flexible tube 7, shown in Fig. 1, to form a manometer. 37 indicates a charge of liquid heavier than water placed in said U-tube, such as carbon tetrachlorid, or mercury. One end of the U-tube is connected by one of the unions 38, 38, to the Pitot tube by tube 4, as before, and the other by the other union 38 to tube 9 which connects with the boiler. In the modification shown in Fig. 6 these manometer constructions are replaced by two ordinary pressure gages, one of which 39 is connected to tube 4 and the other 40, to tube 9'.

In operation a hole is bored in the boiler shell at the point where the internal currents are to be investigated, the bent end of the Pitot tube inserted and the stuffing box screwed into the opening, valves 5, 10 and 21 are opened and 14 closed, and the nozzle of the Pitot tube turned in different directions by means of radial arm 11. The liquid 37 in the manometer will be moved by the varying pressures on the mouth of the tube, the liquid in the branch of the U-tube connected to the end of the Pitot tube or in gage glass 6, being lowered in level and that in the other branch or in gage glass 8, being raised. The position of the radial arm 11 which produces the greatest difference in level will indicate the direction of flow at that point in the boiler. The exact angular position of the arm with reference to the plane of the horizon can be read on the protractor along the plumb line. If the variation in levels of the liquid in the gage glasses is greater than the length of the glasses, the one 8 may be raised and the other 6 lowered, by reason of the flexible tube connections. The direction of flow being determined, the velocity can be calculated by finding the mass or weight of the liquid at that point in the boiler and making the necessary calculation from it, and from the differences of level in the manometer. To find the mass and density of the moving fluid, i. e. what proportion is steam and what proportion water, it is only necessary to determine the amount of heat contained in a given weight. To do this the blow-off valve 16 is opened until the tube system is raised to the temperature of the fluid blown through from the boiler, then the blow off is closed and valve 18 opened to direct this flow into the calorimeter by which the proportions of water and steam existing in the mixture at the opening to the Pitot tube can be determined. From the data thus secured the velocity and direction of flow of the currents in the interior of the boiler or other vessel can be obtained at as many points as desired by inserting the Pitot tube at each point and repeating the above described operations. By shifting clamp 26 in or out on the tube 1, its bent end may project more or less into the boiler, so as to determine the currents existing at different distances from the boiler shell.

Of course other forms of calorimeter and other forms of pressure indicating apparatus could be substituted for those shown, and the details of the arrangement of tubes and valves varied without departing from the principle of operation of my invention as above set out.

Having, therefore, described my invention, I claim:

1. The combination with a Pitot tube of a stuffing box therefor adapted to be inserted in the wall of a closed chamber, said tube being revoluble in said stuffing box and movable endwise therein, and provided with an adjustable clamp engaging said stuffing box.

2. The combination with a Pitot tube of a stuffing box therefor adapted to be inserted through the wall of a closed chamber, said tube being revoluble in said stuffing box and provided with means for determining the angular adjustment thereof, said means comprising a radial arm attached to said tube outside of the stuffing box, and mechanism for measuring the angular position of the arm.

3. The combination with a Pitot tube of a stuffing box therefor adapted to be inserted through the wall of a closed chamber, said tube being revoluble in said stuffing box and provided with means for determining the angular adjustment thereof, said means comprising a radial arm attached to said tube outside of the stuffing box, and mechanism for measuring the angular position of the arm consisting of a protractor fastened to said arm, and a plumb line connected to the arm at the center of the protractor.

4. The combination with a Pitot tube of means for making a tight joint between it and the wall of a closed chamber, an independent connection from the other end of the tube to the interior of said chamber, a calorimeter, and a branch connection from said Pitot tube to the calorimeter.

5. The combination with a Pitot tube of a stuffing box therefor, an adjustable clamp on the tube, and an extension from the stuffing box engaging said clamp.

6. In a device of the kind described, the combination of a tube revoluble on its axis with a calorimeter connected to said tube, together with a blow-off branch from said calorimeter connection, and means for opening and closing said branch.

GEORGE L. FOWLER.

Witnesses:
THOMAS LEAK,
A. PARKER-SMITH.